Feb. 19, 1952 J. G. KRONOUER 2,586,468
DIAL FOR RADIO CABINET
Filed June 17, 1946
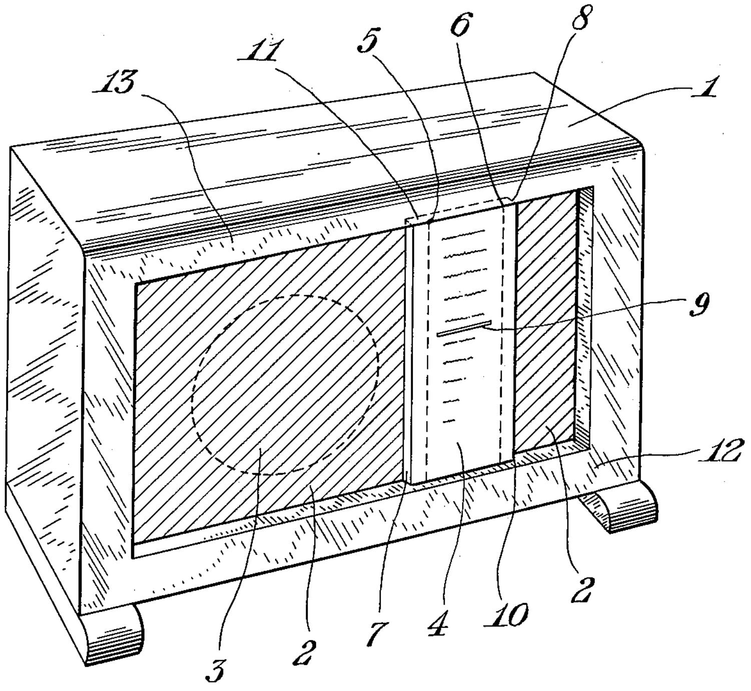
INVENTOR.
JOHAN GEORGE KRONOUER
BY
ATTORNEY.

Patented Feb. 19, 1952

2,586,468

UNITED STATES PATENT OFFICE 2,586,468

DIAL FOR RADIO CABINET

Johan George Kronouer, Eindhoven, Netherlands, assignor to N. V. Philips' Gloeilampenfabrieken, Curacao, Netherlands West Indies Application June 17, 1946, Serial No. 677,387
In Holland January 17, 1942

Section 1, Public Law 690, August 8, 1946
Patent expires January 17, 1962

4 Claims. (Cl. 312—7)

The present invention relates to a case for apparatus comprising a reading scale which is at least partly transparent, more particularly for a radio-receiving set.

With radio receivers and similar devices it is known to make use of a reading scale which is at least partly transparent. More particularly, in radio-receivers, this reading scale is called a "tuning dial." With these receivers an indicator is usually used which is moved along the back of the dial. The names of the stations of the tuning dial may, for instance, be etched in the back of the dial and in the case of a dial consisting of glass, illumination thereof may take place by means of a source of light provided at the sides. Due to the complete reflection, the names of the stations appear brightly lighted on a dark background. Even when making use of a transparent dial, it is desirable under these conditions to provide a recess in the wall of the case of the set in order that the indicator may be driven.

Hitherto it was customary to set the dial entirely in a frame which was either provided separately, or formed by taking up the dial in a material of which the wall of the case consisted of. However, such a construction is rather complicated and consequently entails additional cost.

Furthermore it is known to use a glass plate located in front of the fabric by which the aperture of the loudspeaker is shut off. In this case, it is objectionable to omit the frame entirely while it is desirable for reading that the dial should have a marked outline.

The present invention has for its object to provide a construction for a case of the said kind, in which these drawbacks are avoided, and in which the advantage of a simple and cheap construction is obtained.

According to the invention, this purpose is attained by providing the dial with a free edge at least over part of its boundaries and so proportioned and located in front of an aperture provided in the wall in question of the case that at least one of the free edges of the aperture is covered by the dial, whereas those parts of the dial covering the edges of the aperture are transparent.

Since, according to the invention, the dial is located in front of an aperture of the case, the dial is clearly outlined against the surroundings and at the same time the overlapping edges provide a suitable marginal closure. Under certain conditions the use of the construction according to the invention yields the additional advantage of a material saving in space, while there is a greater freedom in choosing the location of the dial.

The invention will be more fully explained by reference to the accompanying drawing representing a case for a radio receiving set according thereto.

The front side of the case 1 is constituted for the greater part by the panel 2 which stands slightly back and which may be provided with an aperture 3 for a loudspeaker. This panel may be covered with a fabric having a suitable color by which the aperture 3 is hidden from view without harm to the vibrations produced by the loudspeaker.

The panel 2 is provided with a rectangular aperture 4 whose sides are indicated by the dash lines 5 and 6. In front of this aperture the tuning dial is provided with sides 7 and 8 consisting of transparent material such as glass. The dial is so proportioned and located that the opposite edges 5 and 6 of the aperture 4 are covered by the dial. The indicator or hand 9 is moved behind the dial and between the edges 5 and 6.

The dial is not provided with a frame, but in spite of this, an effect corresponding to that of a frame is obtained, since on either side of the dial a strip of the coating fabric, which is provided over the front panel, is visible through the edges 7 and 8 of the dial.

In the form of construction shown in the drawing, edges 7 and 8 of the glass dial are furnished with a faceted edge by which the effect is increased and the dial is set in apertures 10, 11 recessed in the prominent edges 12 and 13.

The dial may be illuminated by means of small lamps located at one or at both sides.

Since no space is required for the frame at the bottom and the top of the dial, more space is available for the dial itself in this construction.

I claim:

1. A cabinet for radio apparatus, comprising an opaque wall member provided with a recessed panel portion having protruding opposing wall portions extending to said wall member, said panel portion being provided with a substantially rectangular recess extending between two of said opposing wall portions, the said two opposing wall portions being provided with recesses, and a rectangular dial plate member positioned over said first recess and having two opposite ends thereof positioned within the recesses of said two opposing wall portions.

2. A cabinet for radio apparatus, comprising an opaque wall member provided with a recessed panel portion having protruding opposing wall portions extending to said wall member, said panel portion being provided with a substantially rectangular recess extending between two of said opposing wall portions, the said two opposing wall portions being provided with recesses, and a transparent rectangular dial plate member positioned over said first recess and having two opposite ends thereof positioned within the recesses of said two opposing wall portions.

3. A cabinet for radio apparatus, comprising an opaque wall member provided with a recessed panel portion having protruding opposing wall portions extending to said wall member, said panel portion being provided with a substantially rectangular recess extending between two of said opposing wall portions and having two side walls, the said two opposing wall portions being provided with recesses, a rectangular dial plate member positioned over said first recess and extending beyond said side walls and having two opposite ends thereof positioned within the recesses of said two opposing wall portions.

4. A cabinet for radio apparatus, comprising an opaque wall member provided with a recessed panel portion having protruding opposing wall portions extending to said wall member, said panel portion being provided with a substantially rectangular recess extending between two of said opposing wall portions and having two side walls, the said two opposing wall portions being provided with recesses, a transparent rectangular dial plate member positioned over said first recess and extending beyond said side walls and having two opposite ends thereof positioned within the recesses of said two opposing wall portions, and a movable dial member positioned in said first recess.

JOHAN GEORGE KRONOUER.

REFERENCES CITED

The following references are of record in the file of this patent:

UNITED STATES PATENTS

| Number | Name | Date |
|---|---|---|
| D. 118,106 | Dillon | Dec. 12, 1939 |
| 1,620,352 | Holtzman | Mar. 8, 1927 |
| 2,150,210 | Dreyfus | Mar. 14, 1939 |
| 2,198,465 | Stokes | Apr. 23, 1940 |
| 2,373,168 | Cockerell | Apr. 10, 1945 |

FOREIGN PATENTS

| Number | Country | Date |
|---|---|---|
| 443,164 | Great Britain | Feb. 24, 1936 |